United States Patent
Onut et al.

(10) Patent No.: US 12,341,812 B2
(45) Date of Patent: Jun. 24, 2025

(54) METHOD OF CORRELATING DISTINCT PHISHING CAMPAIGNS BY IDENTIFYING SHARED MODUS OPERANDI

(71) Applicant: International Business Machines Corporation, Armonk, NY (US)

(72) Inventors: Iosif Viorel Onut, Ottawa (CA); Julien Cassagne, Montreal (CA); Ettore Merlo, Montreal (CA); Guy Jourdan, Ottawa (CA); Cheng-Ta Lee, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 18/060,609

(22) Filed: Dec. 1, 2022

(65) Prior Publication Data
US 2024/0187449 A1    Jun. 6, 2024

(51) Int. Cl.
*H04L 9/40* (2022.01)
*G06F 8/41* (2018.01)

(52) U.S. Cl.
CPC .......... *H04L 63/1483* (2013.01); *G06F 8/427* (2013.01)

(58) Field of Classification Search
CPC ...... G06F 8/31; G06F 9/4498; G06F 11/3664; G06F 21/563; G06F 21/577; G06F 11/3668; G06F 16/9535; G06F 8/34; G06F 8/35; G06F 8/40; G06F 9/48; G06F 2221/033; G06F 40/30; G06F 8/75; G06F 21/52; G06F 16/31; G06F 16/9024; G06F 21/6245; G06F 40/216; G06F 21/566; G06F 8/427; G06F 11/3624; G06F 21/564; G06F 21/567;
(Continued)

(56) References Cited

U.S. PATENT DOCUMENTS

| 10,581,879 B1 | 3/2020 | Paithane et al. |
| 2010/0240044 A1 | 9/2010 | Kumar et al. |

(Continued)

FOREIGN PATENT DOCUMENTS

| CN | 103927473 A | 7/2014 |
| CN | 112507337 A | 3/2021 |

(Continued)

OTHER PUBLICATIONS

Classification of Web Phishing Kits for early detection by platform providers Andrea Venturi, Michele Colajanni, Marco Ramilli, Giorgio Valenziano Santangelo—Print Submitted—Oct. 18, 2022 https://doi.org/10.48550/arXiv.2210.08273 (Year: 2022).*

(Continued)

*Primary Examiner* — Djenane M Bayard
(74) *Attorney, Agent, or Firm* — CANTOR COLBURN LLP; Stosch Sabo

(57) ABSTRACT

Aspects of the invention include techniques for correlating distinct phishing campaigns by identifying shared modus operandi. A non-limiting example method includes building, from a source code, an abstract syntax tree and building, from the abstract syntax tree, a decloaked abstract syntax tree. The method includes removing payload data from the decloaked abstract syntax tree to define an obfuscation pattern. The obfuscation pattern is compared to a plurality of predetermined obfuscation patterns. The method includes correlating, based on the comparison, the source code to one or more phishing kits.

22 Claims, 9 Drawing Sheets

(58) Field of Classification Search
CPC ...... G06F 40/205; G06F 40/279; G06F 40/35; G06F 8/33; G06F 8/423; G06F 8/48; G06F 8/51; G06F 8/53; G06F 8/71; G06F 8/74; G06F 11/302; G06F 11/3466; G06F 11/3636; G06F 16/958; G06F 21/60; G06F 21/125; H04L 63/1483; H04L 63/1416

See application file for complete search history.

(56) References Cited

U.S. PATENT DOCUMENTS

| | | | |
|---|---|---|---|
| 2015/0332055 A1 | 11/2015 | Siman | |
| 2016/0219024 A1 | 7/2016 | Verzun et al. | |
| 2021/0264029 A1 | 8/2021 | Gon et al. | |
| 2021/0385232 A1* | 12/2021 | Kutt | H04L 63/0227 |
| 2022/0116411 A1* | 4/2022 | Melicher | G06F 21/566 |
| 2022/0253744 A1* | 8/2022 | Sloane | G06N 20/00 |
| 2022/0269782 A1 | 8/2022 | Chang et al. | |

FOREIGN PATENT DOCUMENTS

| | | |
|---|---|---|
| TW | 200939065 A | 9/2009 |
| TW | 201701605 A | 1/2017 |

OTHER PUBLICATIONS

Taiwan Patent Office, "First office action," Jan. 8, 2025, 9 Pages, TW Application No. 112132037.

Arceri et al., "Analyzing Dynamic Code: A Sound Abstract Interpreter for Evil Eval" ACM Transactions on Privacy and Security (TOPS) 24.2 (2021): pp. 1-38.

AutoSec Tools, "PHP Vulnerability Hunter Overview," https://www.autosectools.com/PHP-Vulnerability-Scanner (Retrieved Sep. 26, 2022), 2 pages.

Blanc et al. "Characterizing obfuscated JavaScript using abstract syntax trees: Experimenting with malicious scripts." 26th International Conference on Advanced Information Networking and Applications Workshops. IEEE, (2012): pp. 344-351.

Git Hub Fabpot "Local PHP Security Checker" https://github.com/fabpot/local-php-security-checker (Retrieved Sep. 26, 2022), 4 pages.

GITHUB "progpilot : A static analysis tool for security" https://github.com/designsecurity/progpilot (Retrieved Sep. 26, 2022), 5 pages.

GitHub, "PHP Deobfuscator," https://github.com/simon816/PHPDeobfuscator (Retrieved Nov. 23, 2022), 5 pages.

GitHub, "PHPStan—PHP Static Analysis Tool," https://github.com/phpstan/phpstan (Retrieved Sep. 26, 2022), 5 pages.

GITHUB, "Psalm" https://github.com/vimeo/psalm (Retrieved Sep. 26, 2022), 2 pages.

GitHub, "yara-rules," https://github.com/tenable/yara-rules/blob/master/webshells/obfuscated_php.yar (Retrieved Sep. 26, 2022), 2 pages.

Han et al., "Lightweight Detection Method of Obfuscated Landing Sites Based on the AST Structure and Tokens." Applied Sciences 10.17 (2020): pp. 1-19.

JS NICE, "Statistical renaming, Type inference and Deobfuscation" Jsnice.org (Retrieved Sep. 26, 2022), 3 pages.

Li et al. "Effective and light-weight deobfuscation and semantic-aware attack detection for powershell scripts." Proceedings of the 2019 ACM SIGSAC Conference on Computer and Communications Security. (2019): pp. 1831-1847.

List of IBM Patents or Patent Applications Treated as Related; Date Filed: Dec. 2, 2022, 2 pages.

Ndichu et al. "A machine learning approach to detection of JavaScript-based attacks using AST features and paragraph vectors." Applied Soft Computing 84 (2019): 11 pages.

Ndichu et al., "Deobfuscation, unpacking, and decoding of obfuscated malicious JavaScript for machine learning models detection performance improvement." CAAI Transactions on Intelligence Technology 5.3 (2020): pp. 184-192.

R@rgaucher.info, "Grabber," http://rgaucher.info/beta/grabber/ (Retrieved Sep. 26, 2022), 4 pages.

Satish et al., "Phishing Websites Detection Based on Web Source Code and URL in the Webpage." Int. J. Comput. Sci. Eng. Commun. Vol. 1, Issue 1. (2013): pp. 1-5.

SonarQube"Code Quality and Code Security" https://www.sonarqube.org/ (Retrieved Nov. 23, 2022), 5 pages.

Synopsys "Coverity SAST Software" https://www.synopsys.com/ (Retrieved on Sep. 26, 2022), 14 pages.

UnPHP, "PHP Decoder," https://www.unphp.net/ (Retrieved Sep. 26, 2022), 2 pages.

Yue et al., "A measurement study of insecure javascript practices on the web." ACM Transactions on the Web (TWEB) 7.2 (2013): 39 pages.

Onut et al., "Decloaking of Source Code By Feeding Dynamic Interpretation of Suspicious Patterns Into Statistical Analysis To Detect Malicious Intent," U.S. Appl. No. 18/060,610, filed Dec. 1, 2022.

\* cited by examiner

METHOD OF CORRELATING DISTINCT PHISHING CAMPAIGNS BY IDENTIFYING SHARED MODUS OPERANDI

BACKGROUND

The present invention generally relates to malicious code detection, and more specifically, to computer systems, computer-implemented methods, and computer program products for correlating distinct phishing campaigns by identifying shared modus operandi.

Malicious code is a term used to describe any type of code in any part of a software system or script that is intended to cause undesired effects to the underlying system and/or to the system's user(s). Malicious code is often associated with widespread security breaches, but also describes broad categories of attack vectors such as unauthorized access (spyware, rootkits, trojans, backdoors, password stealers, loggers, etc.), ransomware (ransom scripts, adware, etc.), propagation and replication effects (viruses, malware, worms, etc.), privacy (spam, sources of phishing attacks, etc.), or any other digital content that produces malicious activity (e.g., denial-of-service attacks).

Malicious code often employs advanced obfuscation techniques to hide its malicious nature. One such technique is called "packing", which is a way to embed a payload (e.g., malicious source code) in an opaque data structure in a manner that can be done recursively. "Packed" malicious code only gets unpacked and executed at run-time, once the triggering software is executed. Notably, detection methods that require code execution are ineffective against packed malicious code.

Due to the evolving use of various obfuscation techniques, the detection of malicious code is a complex, constantly changing problem to solve. Several analysis techniques for detecting obfuscated malicious code have been proposed. These analysis techniques can be commonly characterized as either dynamic or static analysis techniques. In dynamic analysis the detection of malicious code is performed by collecting information at runtime. In static analysis, information about a piece of software consists of observations in its binary/source code, prior to (or without) executing the code. In general, the key to static analysis is to identify which part(s) of the code are worth analyzing to efficiently classify a program as malicious or not. Recently, a hybrid data analysis approach has been developed that combines both methods by extending the static approach with an aspect-based dynamic analysis, in an attempt to take advantage of both analysis regimes.

Unfortunately, current malicious code analysis techniques (static, dynamic, and hybrid), are somewhat limited. First, most of these techniques focus on finding bugs, vulnerabilities, and identifiers in source code and aim to help developers to use best practices to circumvent these attack vectors. These techniques are not able to provide cloaked code detection and/or decloaking. Moreover, analysis techniques that do offer code de-obfuscation alongside malicious code detection tend to use language dependent approaches instead of performing a complete analysis using data-flow. These types of techniques are therefore limited (by design) to a specific language and are not particularly suited to resolving malicious code having complex data patterns where data flow analysis is required.

SUMMARY

Embodiments of the present invention are directed to techniques for correlating distinct phishing campaigns by identifying shared modus operandi. A non-limiting example method includes building, from a source code, an abstract syntax tree and building, from the abstract syntax tree, a decloaked abstract syntax tree. The method includes removing payload data from the decloaked abstract syntax tree to define an obfuscation pattern. The obfuscation pattern is compared to a plurality of predetermined obfuscation patterns. The method includes correlating, based on the comparison, the source code to one or more phishing kits. Advantageously, correlating obfuscation patterns to identify shared modus operandi in this manner enables an efficient means to identify and qualify a phishing kit(s) in source code, even for partially obfuscated code (e.g., in code where complete de-obfuscation fails or is not possible).

In some embodiments, building the decloaked abstract syntax tree includes unpacking one or more portions of packed code in the source code. Advantageously, de-obfuscating code in this manner enables malicious code evaluations for source code packed using any number of nested function calls.

In some embodiments, removing payload data from the decloaked abstract syntax tree includes removing an argument from a function call encoded in the decloaked abstract syntax tree. Advantageously, abstracting syntax trees in this manner enables obfuscated patterns to be compared even when the underlying arguments (string text, literals, etc.) do not match across source codes.

In some embodiments, comparing the obfuscation pattern to a plurality of predetermined obfuscation patterns includes identifying an abstract syntax tree pattern among the plurality of predetermined obfuscation patterns that matches one of a structure and a substructure of the obfuscation pattern. In some embodiments, correlating the source code to one or more phishing kits includes identifying a set of phishing kits having a recurrent obfuscation pattern that matches the obfuscation pattern. Advantageously, pattern matching in this manner enables distinct phishing campaigns to be correlated, labeled, or otherwise grouped by their shared modus operandi.

In some embodiments, the method further includes parsing the source code, building, from the parsed source code, the abstract syntax tree, extracting, from the abstract syntax tree, a control flow graph, and computing a data flow from the abstract syntax tree and the control flow graph. Advantageously, encoding the source code in this manner enables malicious code evaluations for a wide range of source code types and data flows and enables a complete decloaked abstract syntax tree that captures all de-obfuscation steps, including the final payload and/or any encountered errors.

Embodiments of the present invention are directed to techniques building a repository of obfuscation patterns in support of a statistical analysis of phishing kits. A non-limiting example method includes receiving a dataset having a plurality of known phishing kits and building, for each phishing kit in the dataset, an obfuscation pattern. The obfuscation patterns are compared to identify one or more recurrent obfuscation patterns. The plurality of known phishing kits are grouped within the dataset into two or more sets. Each respective set includes phishing kits having a same recurrent obfuscation pattern.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
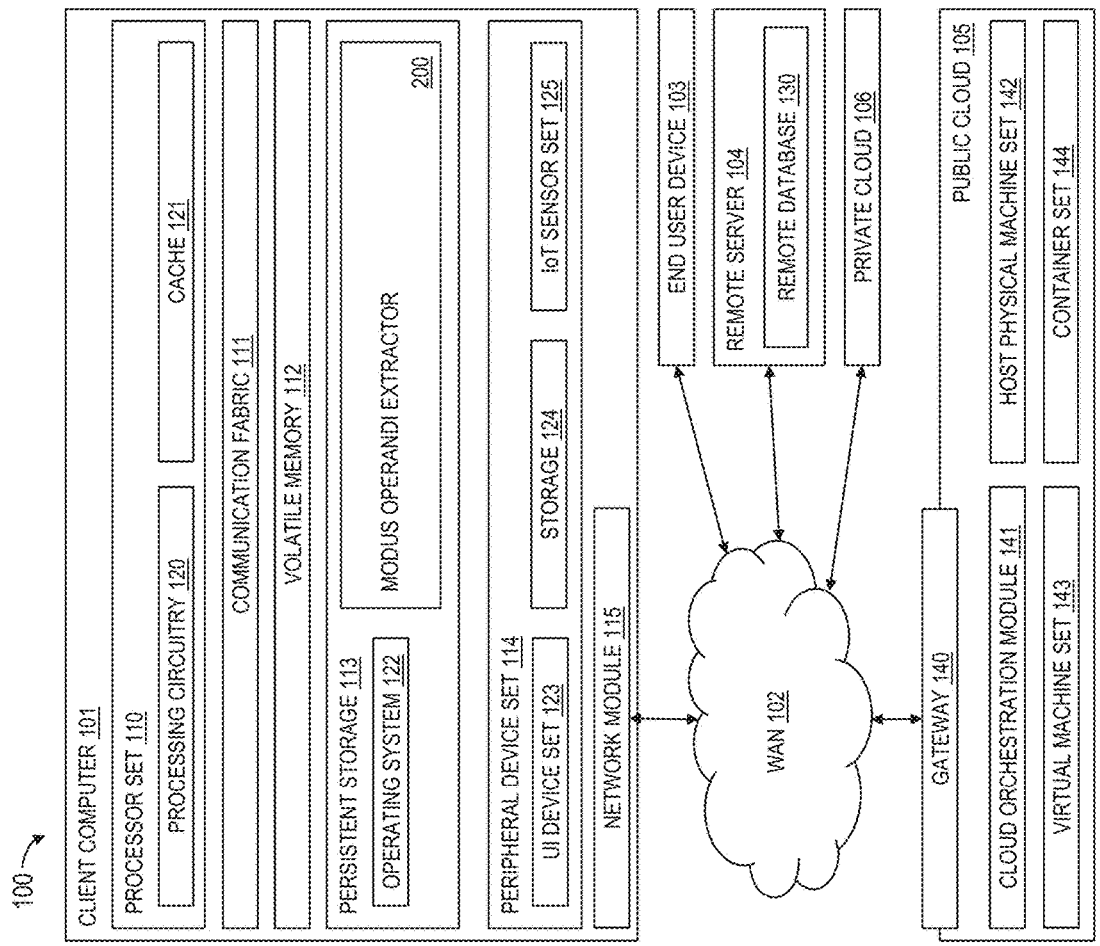
FIG. 1 depicts a block diagram of an example computing environment for use in conjunction with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

The number of phishing attacks more than doubled in frequency from 2019 to 2020 and continues to increase to target workers that are increasingly working remotely. Because of their fraudulent nature, phishing websites are usually deployed on compromised or rogue servers that are not tied to the perpetrator. Therefore, gathering information across multiple attacks can help identify the author of these attacks.

Unfortunately, phishing campaigns (and other malicious code types) often employ advanced obfuscation techniques such as packing to evade modern code analysis techniques. Modern code analysis techniques include, for example, rulesets that can be applied against a body of code to find predetermined textual and/or binary patterns. These rulesets can be used to classify and identify malware samples by creating descriptions of malware families based on common textual or binary patterns. Ruleset-based approaches do not offer native cloaked code detection or decloaking, and are less effective against obfuscated malicious code. Unfortunately, current analysis techniques that do offer code de-obfuscation alongside malicious code detection tend to use language dependent approaches and are not particularly suited to resolving malicious code having complex data patterns where data flow analysis is required.

One or more embodiments of the present invention address one or more of the above-described shortcomings by providing computer-implemented methods, computing systems, and computer program products for correlating distinct phishing campaigns by identifying shared modus operandi among the campaigns. As used herein, a shared "modus operandi" refers to a tree representing the complete obfuscation process used to hide malicious source code. Embodiments of the present invention correlate phishing campaigns by looking for recurrences among the specific techniques used by hackers obfuscate specific parts of the source code (i.e., a shared modus operandi). The entire source code of a phishing site can be referred to collectively as a "phishing kit". Empirically, nearly a quarter (approximately 23%) of observed phishing campaigns could be correlated in this manner, even where a basket of other state-of-the-art processes could not find a correlation.

One or more embodiments of the present disclosure analyze the source code of a phishing site and identify parts of that source code that is obfuscated (e.g., via packing or any other technique). The obfuscated code is decloaked and the specific techniques used to obfuscate specific parts of the source code is analyzed. In particular, the obfuscation techniques employed can themselves be used as a signature or pattern to correlate different phishing campaigns, even when those campaigns target entirely different companies (or individuals) and have completely different functionalities.

Correlating obfuscated instances is challenging, as the source code can have the same code structure (or substructure) but often include different numerical constants, strings, and identifiers. To correlate different phishing campaigns, aspects of the present disclosure detect code obfuscation patterns shared across phishing kits, regardless of their overall code similarity (e.g., by matching the structure of the code without requiring strict matching of constants, strings, and identifiers). Such shared patterns are highly significant as they hide critical data and tend to be re-used by their authors and by later phishing campaigns: it is therefore a source of additional information to help identify the author of these attacks.

To obtain these patterns, one or more embodiments of the present disclosure automatically detects obfuscated structures in a source code and performs de-obfuscation recursively to extract an obfuscation pattern, either complete or partial, depending on the completeness of the available information. Advantageously, even in the case of partial patterns, the syntactic structure of the source code can still be understood and the recurrent instances identified. The authors of the present disclosure observed that, out of nearly two thousand distinct phishing kits (1,939) trialed, one or more embodiments of the present disclosure were able to group half of them into only five groups that reuse the same obfuscation structure. Additionally, 22.48 percent of the phishing campaigns could not have been correlated using traditional similarity analysis.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as modus operandi extractor 200 (also referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
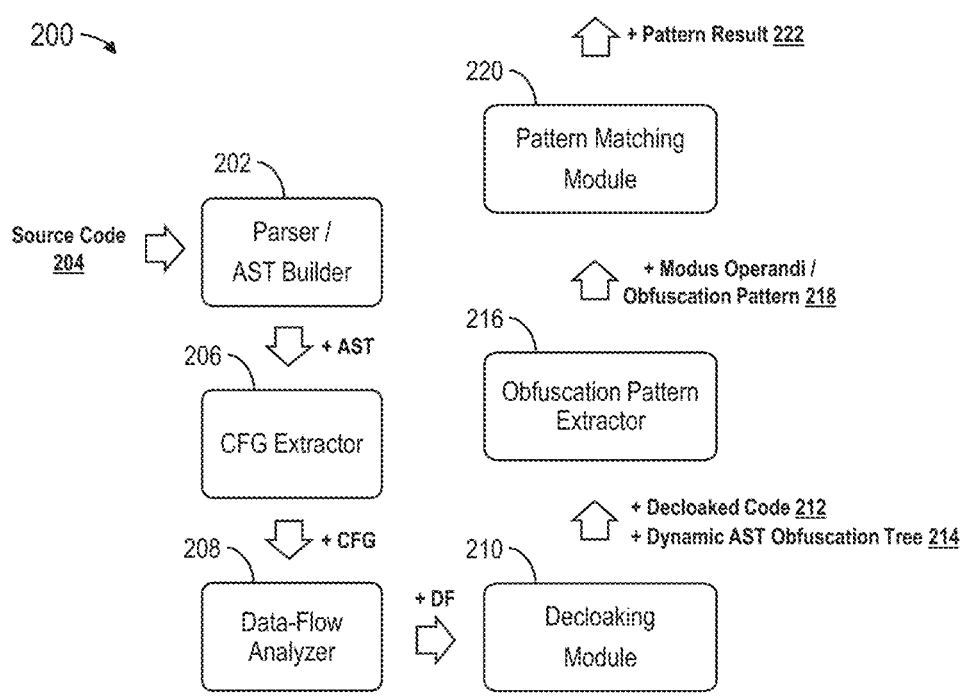
FIG. 2 depicts a block diagram of the modus operandi extractor of FIG. 1 in accordance with one or more embodiments of the present invention.

Referring now to FIG. 2, a block diagram of the modus operandi extractor 200 of FIG. 1 is shown in accordance with one or more embodiments of the present invention. In some embodiments, the modus operandi extractor 200 can be implemented by (in whole or in part) one or more processors (e.g., the computing environment 100 of FIG. 1).

Any number of elements of the computing environment 100 of FIG. 1 may be used in and/or integrated with the modus operandi extractor 200.

As shown in FIG. 2, the modus operandi extractor 200 can include a parser 202 (also referred to as an AST builder) that receives source code 204. In some embodiments, the parser 202 parses the source code 204 and builds, from the parsed code, an AST. The source code 204 can be parsed and the AST can be built using any suitable process(es). The AST encodes the syntax of the source code 204.

In some embodiments, the AST is passed to a control flow graph (CFG) extractor 206. In some embodiments, the CFG extractor 206 extracts, from the AST, a CFG. The CFG can be extracted using any suitable process. The CFG encodes information about the flow of the execution of the source code 204 (e.g., which instruction is executed before one or more other instructions, how do conditionals such as if, else, while affect program execution, etc.).

In some embodiments, the AST and CFG are passed to a data-flow analyzer 208. In some embodiments, the data-flow analyzer 208 builds, from the AST and/or the CFG, a data flow ("DF"). The DF can be built using any suitable process. For example, in some embodiments, the nodes of the respective AST are transformed into DF symbols. The nodes can be visited in a top-down sequence while retaining the data type, encoding, and sanitization tags (when present).

In some embodiments, the DF is passed to a decloaking module 210. In some embodiments, the decloaking module 210 includes various subcomponents for hierarchical analysis, pattern matching, default reasoning, and dynamic tree substitution (not separately shown). In some embodiments, the decloaking module 210 is configured to generate decloaked code 212 and a dynamic AST obfuscation tree 214. The decloaked code 212 and the dynamic AST obfuscation tree 214 can be generated using, for example, a hierarchical default reasoning algorithm that matches function calls in the AST.

Figure 3:
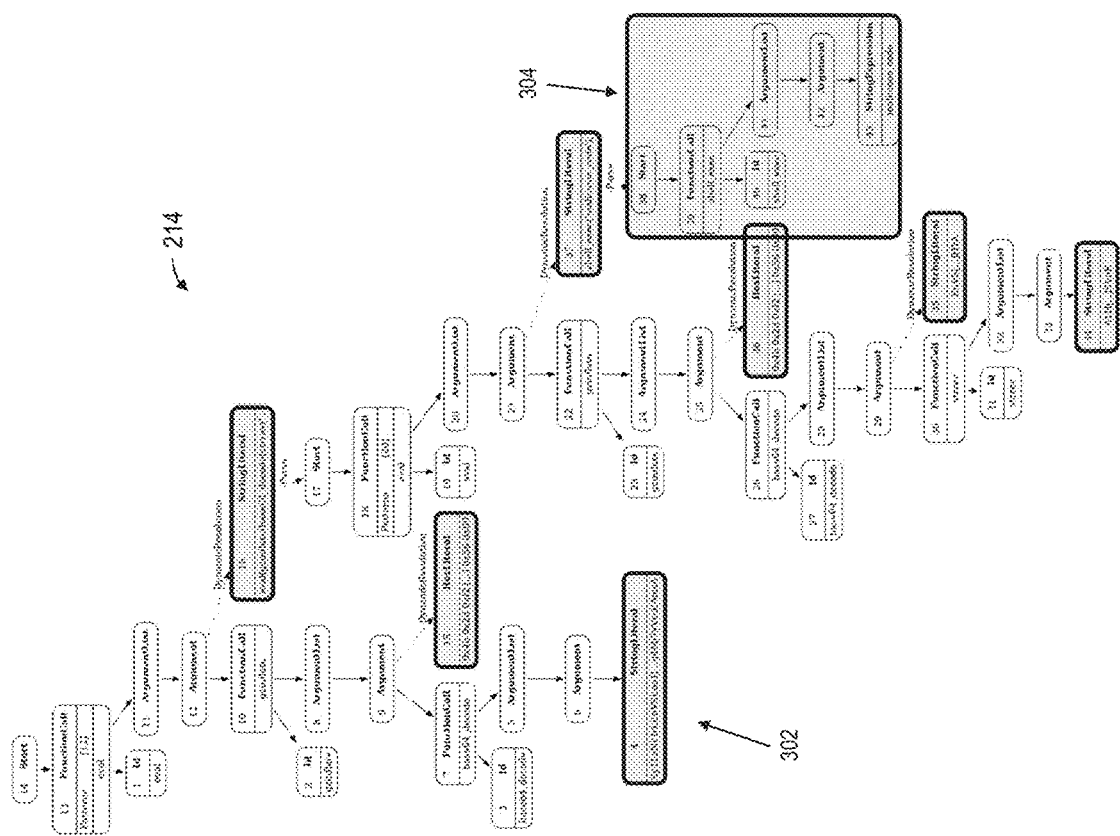
FIG. 3 depicts a graphical representation of an example dynamic AST obfuscation tree generated in accordance with one or more embodiments of the present invention.
Figure 4:
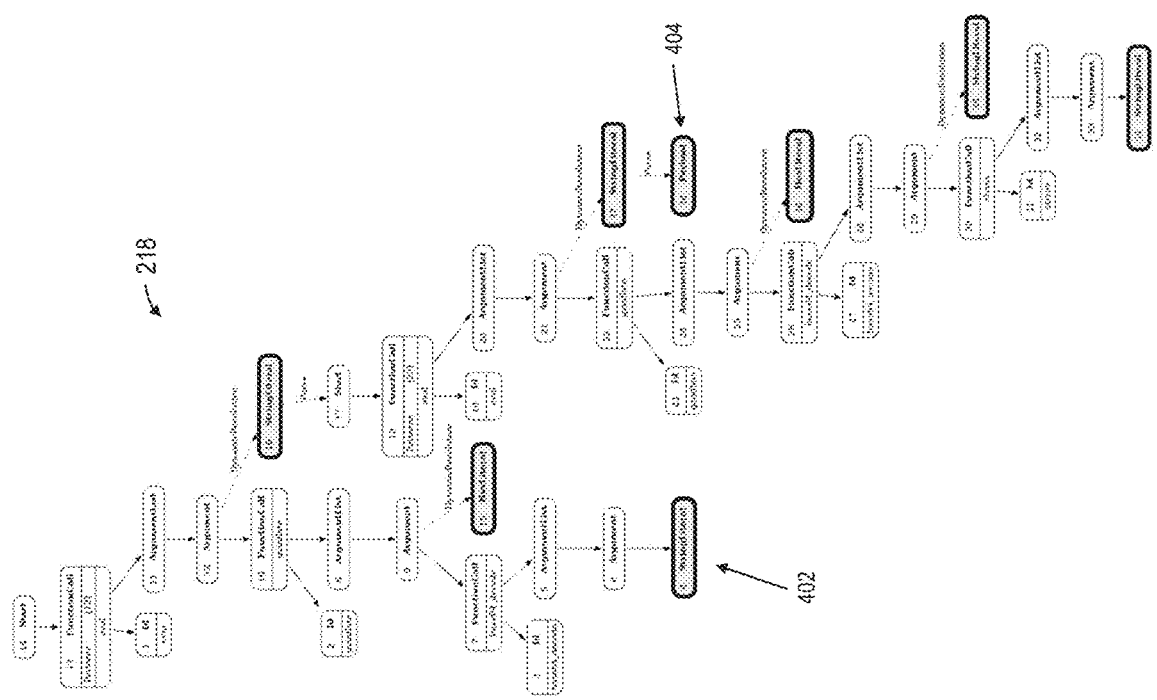
FIG. 4 depicts a graphical representation of an example obfuscation pattern generated in accordance with one or more embodiments of the present invention.

In some embodiments, the decloaked code 212 and the dynamic AST obfuscation tree 214 are passed to an obfuscation pattern extractor 216. In some embodiments, the obfuscation pattern extractor 216 leverages a modus operandi extraction algorithm to remove payload data from the dynamic AST obfuscation tree 214 to generate a modus operandi (e.g., obfuscation pattern 218). An example extraction of a dynamic AST obfuscation tree and its resultant obfuscation pattern is described in greater detail herein with respect to FIGS. 3 and 4. Pseudocode for the modus operandi extraction algorithm is as follows:

```
Modus Operandi Extraction Algorithm Pseudocode ("Algorithm 1")
 1:    global var fingerprints = [ ]
 2:    procedure EXTRACT_FINGERPRINT(deobfuscated_ast)        //See FIG. 3
 3:        var current_fp = remove_payload(deobfuscated_ast)   //See FIG. 4
 4:        for all fp ∈ fingerprints do
 5:            if fp match current_fp
 6:                matched = True
 7:                print("Matched existing fingerprint fp")
 8:                return
 9:            end if
10:        end for
11:        fingerprints.append(current_fp)
12:        print("New fingerprint detected")
13:    end procedure
```

FIG. 3 depicts a graphical representation of an example dynamic AST obfuscation tree 214 generated in accordance with one or more embodiments of the present invention (i.e., the output of the decloaking algorithm). FIG. 4 depicts a graphical representation of an example obfuscation pattern 218 generated in accordance with one or more embodiments of the present invention (i.e., the obfuscation pattern/fingerprint that results from the Modus Operandi Extraction Algorithm). The shaded nodes highlight the portion(s) of the respective tree that changed during the transformation.

In some embodiments, the obfuscation pattern 218 is passed to a pattern matching module 220. In some embodiments, the pattern matching module 220 performs a tree pattern matching algorithm among one or more other obfuscated structures in a dataset of known obfuscation structures to identify one or more recurrent patterns. In some embodiments, the tree pattern matching algorithm comprises identifying one or more structures and/or substructures of the obfuscation pattern 218 that are also found in the one or more other obfuscated structures. In other words, the pattern matching module 220 is configured to compare and detect a similarity in structure/substructure between the obfuscation pattern 218 and a dataset of known obfuscation structures. In some embodiments, successively larger (or smaller) substructures in the obfuscation pattern 218 are checked against a database of known obfuscated structures (using, e.g., k-nearest neighbors to a random node in the obfuscation pattern 218, all child nodes from a randomly or progressively assigned initial node, etc.). In some embodiments, the tree-matching algorithm compares the current obfuscation pattern to the previous known pattern(s) (stored, e.g., in the pattern database). In some embodiments, the obfuscation pattern is composed of a set of nodes and edges. Each node contains two pieces of information: the node type and a token value. In some embodiments, the token values are ignored, as they carry only payload information, whereas the token types, which carry semantic information about the respective obfuscation pattern, are retained. In some embodiments, the tree-matching algorithm uses a depth-first search (DFS). In a DFS, the pattern matching module 220 traverses the tree and successively compares each node type and its position. If no discrepancy is found, the two patterns match.

In some embodiments, the pattern matching module 220 is configured to output a pattern result 222. The pattern result 222 can include, for example, identifiers for one or more matching obfuscation patterns. In some embodiments, the pattern result 222 can indicate, based on the comparison between the obfuscation pattern 218 and the dataset of known obfuscation structures, whether the source code 204 contains code matching known phishing kits. In other words, the pattern result 222 can indicate whether the source code 204 is malicious code.

Pattern Matching and Modus Operandi Classification Using Real Datasets.

As described previously with respect to the preceding algorithms and corresponding pseudocode, the modus operandi extractor 200 outputs a pattern result 222 indicating whether source code 204 includes AST patterns matching known phishing kits. In some embodiments, the modus operandi extractor 200 includes an obfuscation pattern database (not separately shown) formed from real datasets including a number of known obfuscation structures.

In some embodiments, for example, the obfuscation patterns of nearly two thousand (1,939) phishing kits were extracted according to one or more embodiments to generate an initial (seed) dataset of known obfuscation patterns. 4,859 obfuscated structures were detected, which were distributed among 129 different AST patterns. Notably, 5 patterns corresponded to more than half of the obfuscated structures. In particular, the 6 most common patterns represented 19.99%, 12.96%, 7.64%, 7.54%, 5.53%, and 5.32%, respectively (~59 percent) of all obfuscation patterns.

Figure 5:
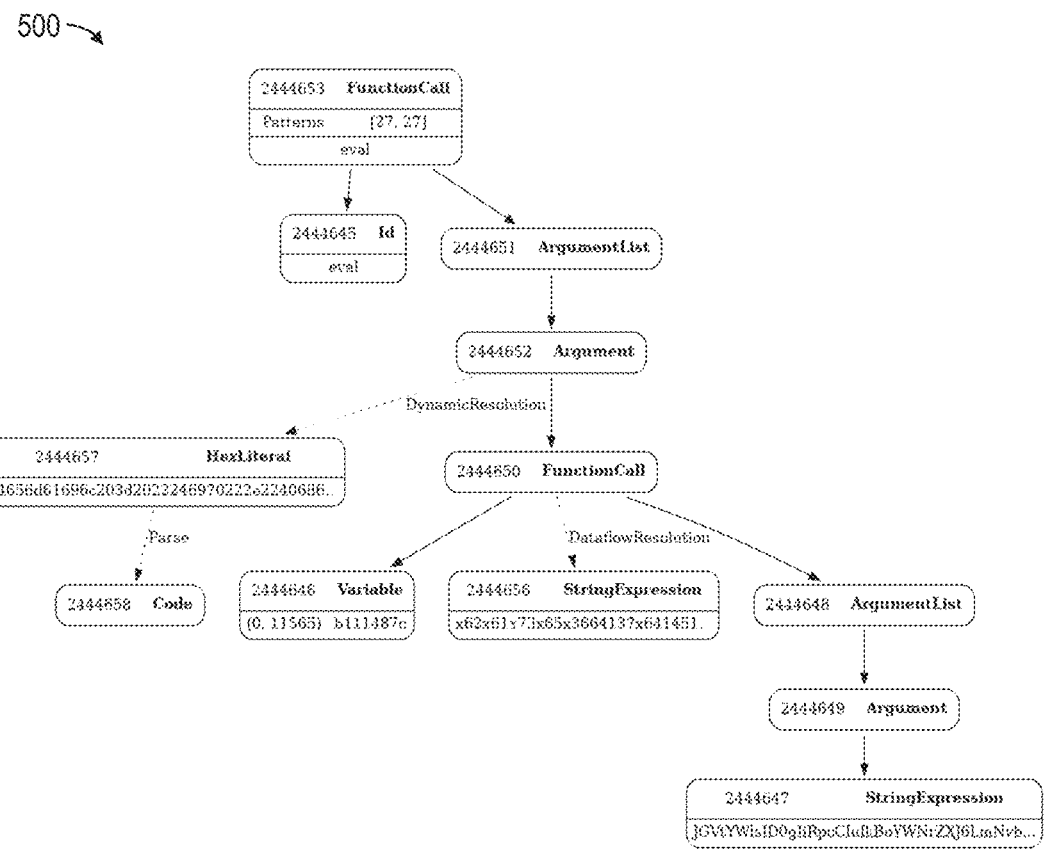
FIG. 5 depicts a graphical representation of a first recurrent obfuscation pattern generated in accordance with one or more embodiments of the present invention.
Figure 6:
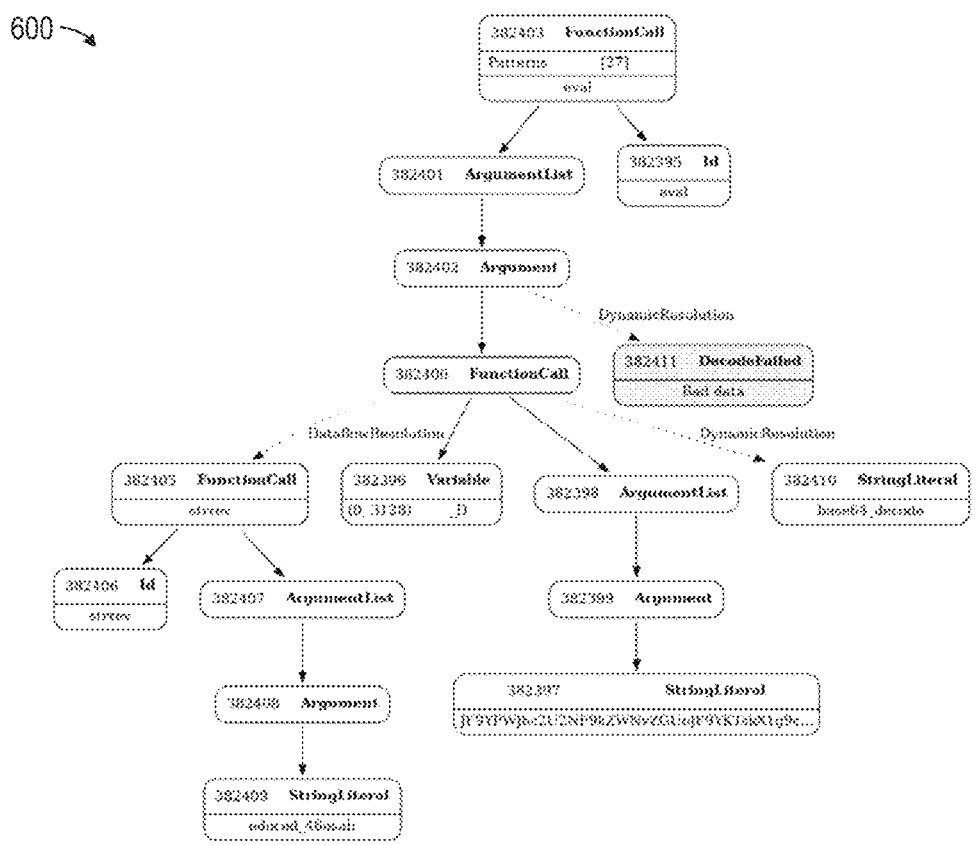
FIG. 6 depicts a graphical representation of a second recurrent obfuscation pattern generated in accordance with one or more embodiments of the present invention.
Figure 7:
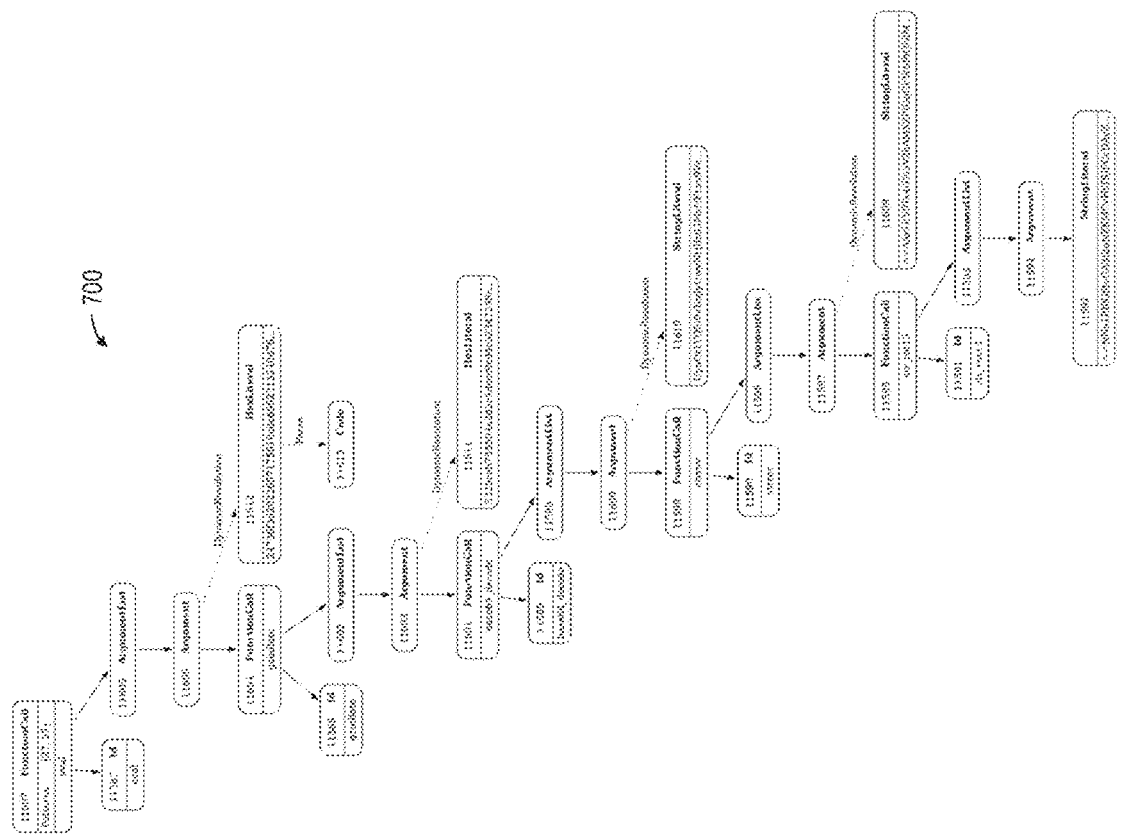
FIG. 7 depicts a graphical representation of a third recurrent obfuscation pattern generated in accordance with one or more embodiments of the present invention.

From these results, aspects of the present invention are able to group phishing kits by their obfuscation patterns. FIGS. 5, 6, and 7 depict a graphical representation of the first, second, and third most recurrent obfuscation patterns 500, 600, and 700, respectively, generated in accordance with one or more embodiments of the present invention. Notably, the groups are composed of a significant amount of phishing kits that are strictly not similar to each other (22.48%), meaning that these phishing kits could not have been caught using conventional code similarity analysis. However, advantageously, these phishing kits include obfuscation patterns that perpetrators purposefully (or even inadvertently) re-use. Re-use of obfuscation patterns can be used according to one or more embodiments to detect the same actors (e.g., hackers), even when the kits are used against different targets and implemented via different attack vectors. Observe that these patterns can be highly complex, but advantageously, the fact that several phishing kits share such complex patterns allows aspects of the present invention to correlate the actors that created and/or used them.

Illustrative Example

The following is a step by step example for correlating distinct phishing campaigns by identifying shared modus operandi according to the preceding algorithms and corresponding pseudocode for the modus operandi extractor 200. This example assumes implementation within the PHP language for ease of discussion, but could be implemented for any language that supports dynamic code interpretation (the "eval" function call in PHP).

First, consider a task where a file containing PHP source code will be analyzed.

STEP 1: Parse the initial source code.

```
Parsed Source Code
    <? php
    1: [...]
    2: eval (gzinflate (base64_decode ('Sy1LzN...KTatcEmsA')));
    3: [...]
```

STEP 2: Build CFG and Data-Flow (refer to the functionality of the parser 202, CFG Extractor 206, and Data-flow analyzer 208, described previously herein).

STEP 3: Perform de-obfuscation. By applying the algorithms described previously, the following decloaked code 212 is produced, as well as a dynamic AST obfuscation tree 214 (as shown in FIG. 3).

```
Output Decloaked Source Code
    <? php
    1: [...]
    2: shell_exec("malicious_code");
    3: [...]
```

STEP 4: Extract modus operandi. The dynamic AST obfuscation tree 214 is converted into an obfuscation pattern (e.g., obfuscation pattern 218 shown in FIG. 4) using the Modus Operandi Extraction Algorithm Pseudocode ("Algorithm 1") described previously. During the transformation process, various function calls are abstracted by removing their specific functionality (e.g., the specific arguments of the respective function call). For example, note the transformation of the function call 302 in FIG. 3 ("4. StringLiteral: 'Sy1LzN . . . KTatcEmsA'") to the abstracted function call 402 in FIG. 4 ("StringLiteral"). Further note the transformation of the payload 304 in FIG. 3 ("4. StringLiteral: 'Sy1LzN . . . KTatcEmsA'") to the abstracted payload 404 in FIG. 4 ("Payload").

STEP 5: Obfuscate pattern matching. The pattern matching module 220 attempts to match the obfuscation pattern 218 against one or more patterns in an obfuscation pattern dataset (not separately shown). If the obfuscation pattern 218 matches one or more predetermined patterns, the modus operandi extractor 200 and/or pattern matching module 220 identifies the pattern and outputs a corresponding pattern result 222. If the obfuscation pattern 218 does not match at least one of the predetermined patterns, the modus operandi extractor 200 can, in some embodiments, add the new pattern to the database of patterns (not separately shown). In this case, the obfuscation pattern 218 is a new pattern. In some embodiments, the pattern result 222 flags the obfuscation pattern 218 as malicious code (or as a new phishing kit).

Figure 8:
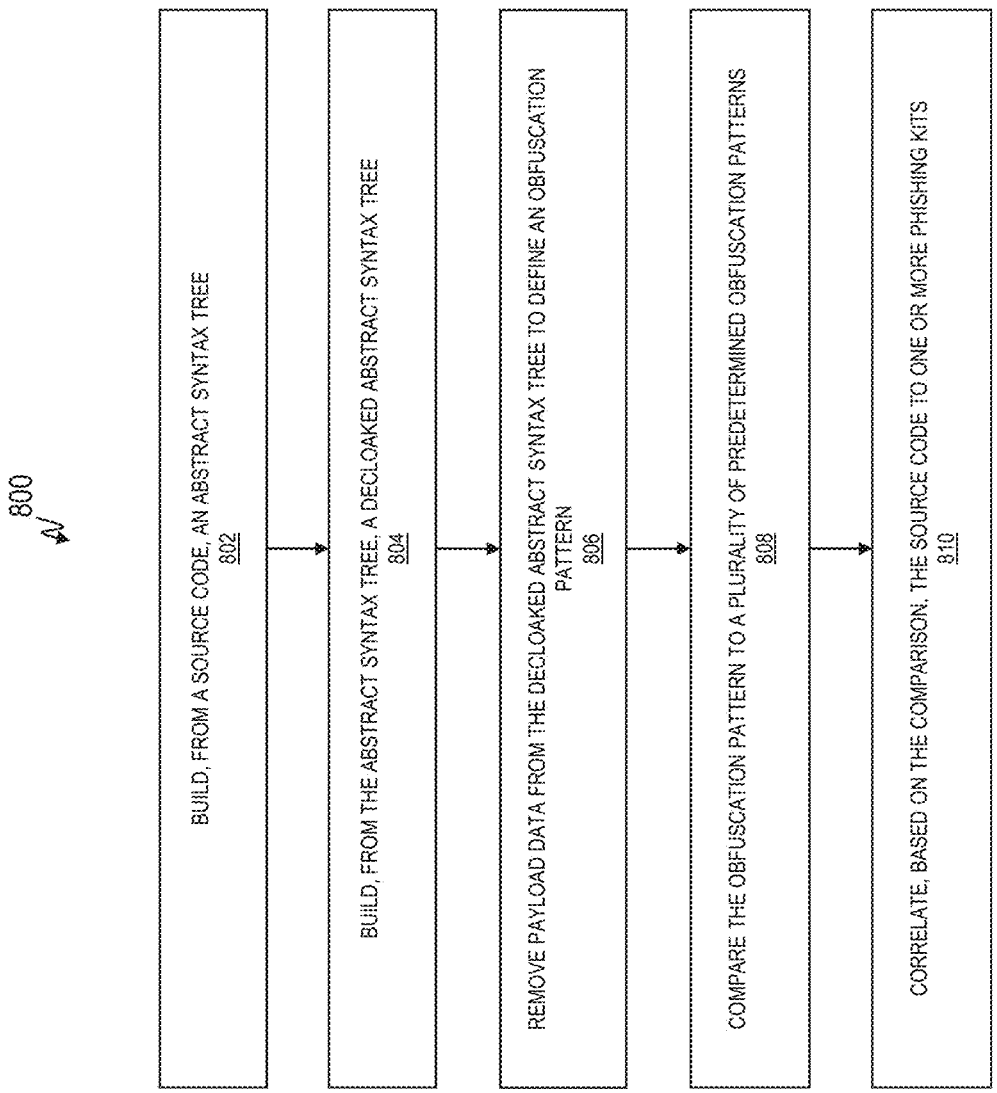
FIG. 8 is a flowchart in accordance with one or more embodiments of the present invention.

Referring now to FIG. 8, a flowchart 800 for correlating distinct phishing campaigns by identifying shared modus operandi is generally shown according to an embodiment. The flowchart 800 is described in reference to FIGS. 1-7 and may include additional blocks not depicted in FIG. 8. Although depicted in a particular order, the blocks depicted in FIG. 8 can be rearranged, subdivided, and/or combined.

At block 802, an abstract syntax tree is built from a source code.

At block 804, a decloaked abstract syntax tree is built from the abstract syntax tree. In some embodiments, building the decloaked abstract syntax tree comprises unpacking one or more portions of packed code in the source code.

At block 806, payload data from the decloaked abstract syntax tree is removed to define an obfuscation pattern. In some embodiments, removing payload data from the decloaked abstract syntax tree includes removing an argument from a function call encoded in the decloaked abstract syntax tree.

At block 808, the obfuscation pattern is compared to a plurality of predetermined obfuscation patterns. In some embodiments, comparing the obfuscation pattern to a plurality of predetermined obfuscation patterns includes identifying an abstract syntax tree pattern among the plurality of predetermined obfuscation patterns that matches one of a structure and a substructure of the obfuscation pattern.

At block 810, the source code is correlated, based on the comparison, to one or more phishing kits. In some embodiments, correlating the source code to one or more phishing kits includes identifying a set of phishing kits comprising a recurrent obfuscation pattern that matches the obfuscation pattern.

In some embodiments, the method includes parsing the source code, building, from the parsed source code, the abstract syntax tree, extracting, from the abstract syntax tree, a control flow graph, and computing a data flow from the abstract syntax tree and the control flow graph.

Figure 9:
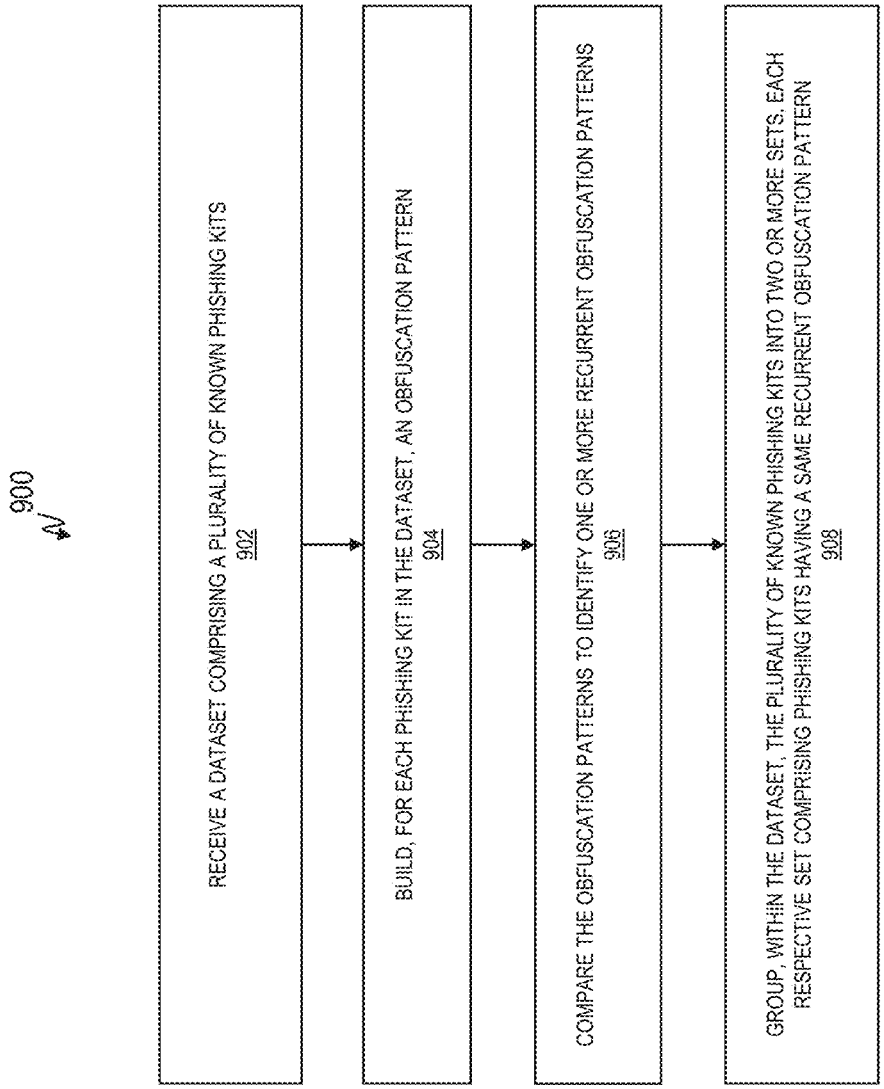
FIG. 9 is a flowchart in accordance with one or more embodiments of the present invention.

Referring now to FIG. 9, a flowchart 900 for building a repository of obfuscation patterns in support of a statistical analysis of phishing kits is generally shown according to an embodiment. The flowchart 900 is described in reference to FIGS. 1-7 and may include additional blocks not depicted in FIG. 9. Although depicted in a particular order, the blocks depicted in FIG. 9 can be rearranged, subdivided, and/or combined.

At block 902, a dataset having a plurality of known phishing kits is received. At block 904, an obfuscation pattern is built for each phishing kit in the dataset.

At block 906, the obfuscation patterns are compared to identify one or more recurrent obfuscation patterns. At block 908, the plurality of known phishing kits are grouped, within the dataset, into two or more sets. Each respective set includes phishing kits having a same recurrent obfuscation pattern.

Technical advantages and benefits include the identification of modus operandi (i.e., the tree(s) representing the complete obfuscation process used to hide malicious source code) and their respective payloads (i.e., the malicious code). Moreover, aspects of the present invention can leverage reference datasets of known obfuscation patterns to identify clusters of modus operandi. Advantageously, modus operandi can be discovered even when decloaking fails (or partially fails), as the AST abstraction techniques employed by the system are fault tolerant. Systems built according to one or more embodiments can identify obfuscation signatures (modus operandi) together and/or separately from payloads after the decloaking process, allowing for a variety of statistical measures to be computed (e.g., identify and classify clusters of identical/parametric modus operandi, identify and classify clusters of identical/parametric payloads, collect information and perform analysis of modus operandi, even when payload itself cannot be decloaked, determine demographics and statistics of identical/parametric modus operandi, determine demographics and statistics of identical/parametric attack code, such as decloaked payloads, etc.).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   building, from a source code, an abstract syntax tree;
   building, from the abstract syntax tree, a decloaked abstract syntax tree;
   removing payload data from the decloaked abstract syntax tree to define an obfuscation pattern by removing at least one argument from a function call encoded in the decloaked abstract syntax tree;
   comparing the obfuscation pattern to a plurality of predetermined obfuscation patterns, wherein the obfuscation pattern and predetermined obfuscation patterns comprise nodes and edges, wherein each node has a node type and a token value, and wherein comparing the obfuscation pattern comprises ignoring the token values; and
   correlating, based on the comparison, the source code to one or more phishing kits; and
   blocking, prior to execution, the source code responsive to at least one phishing kit correlating to the source code having the obfuscation pattern.

2. The computer-implemented method of claim 1, wherein building the decloaked abstract syntax tree comprises unpacking one or more portions of packed code in the source code.

3. The computer-implemented method of claim 1, wherein comparing the obfuscation pattern to a plurality of predetermined obfuscation patterns comprises identifying an abstract syntax tree pattern among the plurality of predetermined obfuscation patterns that matches one of a structure and a substructure of the obfuscation pattern.

4. The computer-implemented method of claim 1, wherein correlating the source code to one or more phishing kits comprises identifying a set of phishing kits comprising a recurrent obfuscation pattern that matches the obfuscation pattern.

5. The computer-implemented method of claim 1, further comprising:
   parsing the source code;
   building, from the parsed source code, the abstract syntax tree;
   extracting, from the abstract syntax tree, a control flow graph; and
   computing a data flow from the abstract syntax tree and the control flow graph.

6. A system having a memory, computer readable instructions, and one or more processors for executing the computer readable instructions, the computer readable instructions controlling the one or more processors to perform operations comprising:
   building, from a source code, an abstract syntax tree;
   building, from the abstract syntax tree, a decloaked abstract syntax tree;
   removing payload data from the decloaked abstract syntax tree to define an obfuscation pattern by removing at least one argument from a function call encoded in the decloaked abstract syntax tree;
   comparing the obfuscation pattern to a plurality of predetermined obfuscation patterns;
   correlating, based on the comparison, the source code to one or more phishing kits; and
   blocking, prior to execution, the source code responsive to at least one phishing kit correlating to the source code having the obfuscation pattern.

7. The system of claim 6, wherein building the decloaked abstract syntax tree comprises unpacking one or more portions of packed code in the source code.

8. The system of claim 6, wherein comparing the obfuscation pattern to a plurality of predetermined obfuscation patterns comprises identifying an abstract syntax tree pattern among the plurality of predetermined obfuscation patterns that matches one of a structure and a substructure of the obfuscation pattern.

9. The system of claim 6, wherein correlating the source code to one or more phishing kits comprises identifying a set of phishing kits comprising a recurrent obfuscation pattern that matches the obfuscation pattern.

10. The system of claim 6, further comprising:
    parsing the source code;

building, from the parsed source code, the abstract syntax tree;
extracting, from the abstract syntax tree, a control flow graph; and
computing a data flow from the abstract syntax tree and the control flow graph.

11. A computer program product comprising a non-transitory computer readable storage medium having program instructions embodied therewith, the program instructions executable by one or more processors to cause the one or more processors to perform operations comprising:
building, from a source code, an abstract syntax tree;
building, from the abstract syntax tree, a decloaked abstract syntax tree;
removing payload data from the decloaked abstract syntax tree to define an obfuscation pattern by removing at least one argument from a function call encoded in the decloaked abstract syntax tree;
comparing the obfuscation pattern to a plurality of predetermined obfuscation patterns;
correlating, based on the comparison, the source code to one or more phishing kits; and
blocking, prior to execution, the source code responsive to at least one phishing kit correlating to the source code having the obfuscation pattern.

12. The computer program product of claim 11, wherein building the decloaked abstract syntax tree comprises unpacking one or more portions of packed code in the source code.

13. The computer program product of claim 11, wherein comparing the obfuscation pattern to a plurality of predetermined obfuscation patterns comprises identifying an abstract syntax tree pattern among the plurality of predetermined obfuscation patterns that matches one of a structure and a substructure of the obfuscation pattern.

14. The computer program product of claim 11, wherein correlating the source code to one or more phishing kits comprises identifying a set of phishing kits comprising a recurrent obfuscation pattern that matches the obfuscation pattern.

15. The computer program product of claim 11, further comprising:
parsing the source code;
building, from the parsed source code, the abstract syntax tree;
extracting, from the abstract syntax tree, a control flow graph; and
computing a data flow from the abstract syntax tree and the control flow graph.

16. A computer-implemented method comprising:
receiving a dataset comprising a plurality of known phishing kits;
building, for each phishing kit in the dataset, an obfuscation pattern by removing, for each obfuscation pattern, at least one argument from a function call encoded in a corresponding decloaked abstract syntax tree;
comparing the obfuscation patterns to identify one or more recurrent obfuscation patterns;
grouping, within the dataset, the plurality of known phishing kits into two or more sets, each respective set comprising phishing kits having a same recurrent obfuscation pattern; and
blocking, prior to execution, source code responsive to at least one phishing kit of the plurality of known phishing kits having a recurrent obfuscation pattern matching the source code.

17. The computer-implemented method of claim 16, wherein building each respective obfuscation pattern comprises:
building, from a source code of the respective phishing kit, an abstract syntax tree;
building, from the abstract syntax tree, a decloaked abstract syntax tree; and
removing payload data from the decloaked abstract syntax tree to define the respective obfuscation pattern.

18. The computer-implemented method of claim 17, wherein building the decloaked abstract syntax tree comprises unpacking one or more portions of packed code in the source code.

19. The computer-implemented method of claim 17, wherein removing payload data from the decloaked abstract syntax tree comprises removing an argument from a function call encoded in the decloaked abstract syntax tree.

20. The computer-implemented method of claim 17, wherein comparing the obfuscation patterns to identify one or more recurrent obfuscation patterns comprises identifying two or more obfuscation patterns having a same tree structure or tree substructure.

21. A system having a memory, computer readable instructions, and one or more processors for executing the computer readable instructions, the computer readable instructions controlling the one or more processors to perform operations comprising:
receiving a dataset comprising a plurality of known phishing kits;
building, for each phishing kit in the dataset, an obfuscation pattern by removing, for each obfuscation pattern, at least one argument from a function call encoded in a corresponding decloaked abstract syntax tree;
comparing the obfuscation patterns to identify one or more recurrent obfuscation patterns;
grouping, within the dataset, the plurality of known phishing kits into two or more sets, each respective set comprising phishing kits having a same recurrent obfuscation pattern; and
blocking, prior to execution, source code responsive to at least one phishing kit of the plurality of known phishing kits having a recurrent obfuscation pattern matching the source.

22. The system of claim 21, wherein building each respective obfuscation pattern comprises:
building, from a source code of the respective phishing kit, an abstract syntax tree;
building, from the abstract syntax tree, a decloaked abstract syntax tree; and
removing payload data from the decloaked abstract syntax tree to define the respective obfuscation pattern.

* * * * *